United States Patent
Sako (10) Patent No.: US 7,496,967 B2
(45) Date of Patent: Feb. 24, 2009

(54) INFORMATION SERVICE METHOD AND INFORMATION SERVICE SYSTEM

(75) Inventor: Yoichiro Sako, Tokyo (JP)

(73) Assignee: Sony Corporation (JP)

(*) Notice: Subject to any disclaimer, the term of this patent is extended or adjusted under 35 U.S.C. 154(b) by 1030 days.

(21) Appl. No.: 10/311,495

(22) PCT Filed: Apr. 18, 2002

(86) PCT No.: PCT/JP02/03876
§ 371 (c)(1),
(2), (4) Date: Mar. 18, 2003

(87) PCT Pub. No.: WO02/086859
PCT Pub. Date: Oct. 31, 2002

(65) Prior Publication Data
US 2003/0158950 A1    Aug. 21, 2003

(30) Foreign Application Priority Data
Apr. 20, 2001 (JP) .............................. 2001-123530

(51) Int. Cl.
*G06F 7/04* (2006.01)
*G06F 17/30* (2006.01)
(52) U.S. Cl. .................................................. 726/30
(58) Field of Classification Search .................... 726/30
See application file for complete search history.

(56) References Cited

U.S. PATENT DOCUMENTS

| 6,453,420 | B1* | 9/2002 | Collart | 726/26 |
| 7,065,503 | B2* | 6/2006 | Matsushima et al. | 705/51 |
| 2001/0037459 | A1* | 11/2001 | Ogawa et al. | 713/200 |
| 2006/0085821 | A9* | 4/2006 | Simmons et al. | 725/61 |

FOREIGN PATENT DOCUMENTS

| JP | 11-260045 A | 9/1999 |
| JP | 2000-315278 A | 11/2000 |

* cited by examiner

*Primary Examiner*—Matthew Smithers
(74) *Attorney, Agent, or Firm*—Lerner, David, Littenberg, Krumholz & Mentlik, LLP (57) ABSTRACT

An information service method including the steps of reading out unique identification information written on a recording medium using a terminal equipment upon installation of the recording medium, transmitting the read-out unique identification information from the terminal equipment via a communication network, and registering the transmitted unique identification information using a server apparatus. The server apparatus then judges whether data related to the owner of the recording medium corresponding to the transmitted unique identification information exists, and data related to dedicated service intended for the owner is transmitted to the terminal equipment when it is judged that data related to the owner exists.

30 Claims, 9 Drawing Sheets

INFORMATION SERVICE METHOD AND INFORMATION SERVICE SYSTEM

TECHNICAL FIELD

The present invention relates to an information service method and an information service system which provides the owner of a recording medium having contents such as music, etc. recorded thereon with service concerning the contents from a manufacturer or a manufacturing company of the contents.

BACKGROUND ART

Conventionally, in general, the owner of a recording medium such as an optical disc having contents of music, etc. recorded thereon does not write information about the ownership of the recording medium to the recording area thereof. Thus, it is difficult for the user to specify his optical disc among similar recording media of the same appearance. So, there is proposed a recording medium to which the user can write his identification information so as to distinguish his optical disc from other similar recording media.

On the other hand, such identification information written to a recording medium by the user is utilized only to confirm the ownership and non-ownership of the recording medium, and there has not been proposed a method utilizing the identification information with a communication network such as the internet linked to a manufacturer.

DISCLOSURE OF THE INVENTION

Accordingly, the present invention has an object to overcome the above-mentioned drawbacks of the prior art by providing an information service method and an information service system which can transmit identification information written to a recording medium having contents such as music, etc. recorded thereon to a manufacturer via a communication network so as to provide the user with various service.

The above object can be attained by providing an information service method, including the steps of reading out unique identification information written on a recording medium using a terminal equipment on installation of the recording medium, transmitting the read out unique identification information from the terminal equipment via a communication network, and registering the transmitted unique identification information using a server apparatus.

According to the information service method, it is judged whether data related to the owner of the recording medium corresponding to the transmitted unique identification information exists or not by the server apparatus, and data related to dedicated service intended for the owner is transmitted to the terminal equipment in case it is judged that data related to the owner exists.

Also, the above object can be attained by providing an information service system, including at least one terminal equipment for reading out unique identification information written on a recording medium, the recording medium being installed to the terminal equipment, and a server apparatus for registering the unique identification information transmitted via a communication network, server apparatus connected to the terminal equipment via the communication network.

According to the information service system, the server apparatus judges whether data related to the owner of the recording medium corresponding to the transmitted unique identification information exists or not, and transmits data related to dedicated service intended for the owner to the terminal equipment in case it is judged that data related to the owner exists.

Also, the above object can be attained by providing an information service method, including the steps of reading out unique identification information written on a recording medium using a terminal equipment on installation of the recording medium, transmitting the read out unique identification information from the terminal equipment via a communication network, and transmitting data related to dedicated service intended for the owner corresponding to the transmitted unique identification information to the terminal equipment from the server apparatus.

These objects and other objects, features and advantages of the present invention will become more apparent from the following detailed description of the preferred embodiments of the present invention.

BEST MODE FOR CARRYING OUT THE INVENTION

The information service method and the information service system according to the present invention will further be described below concerning the best modes with reference to the accompanying drawings.

Figure 1:
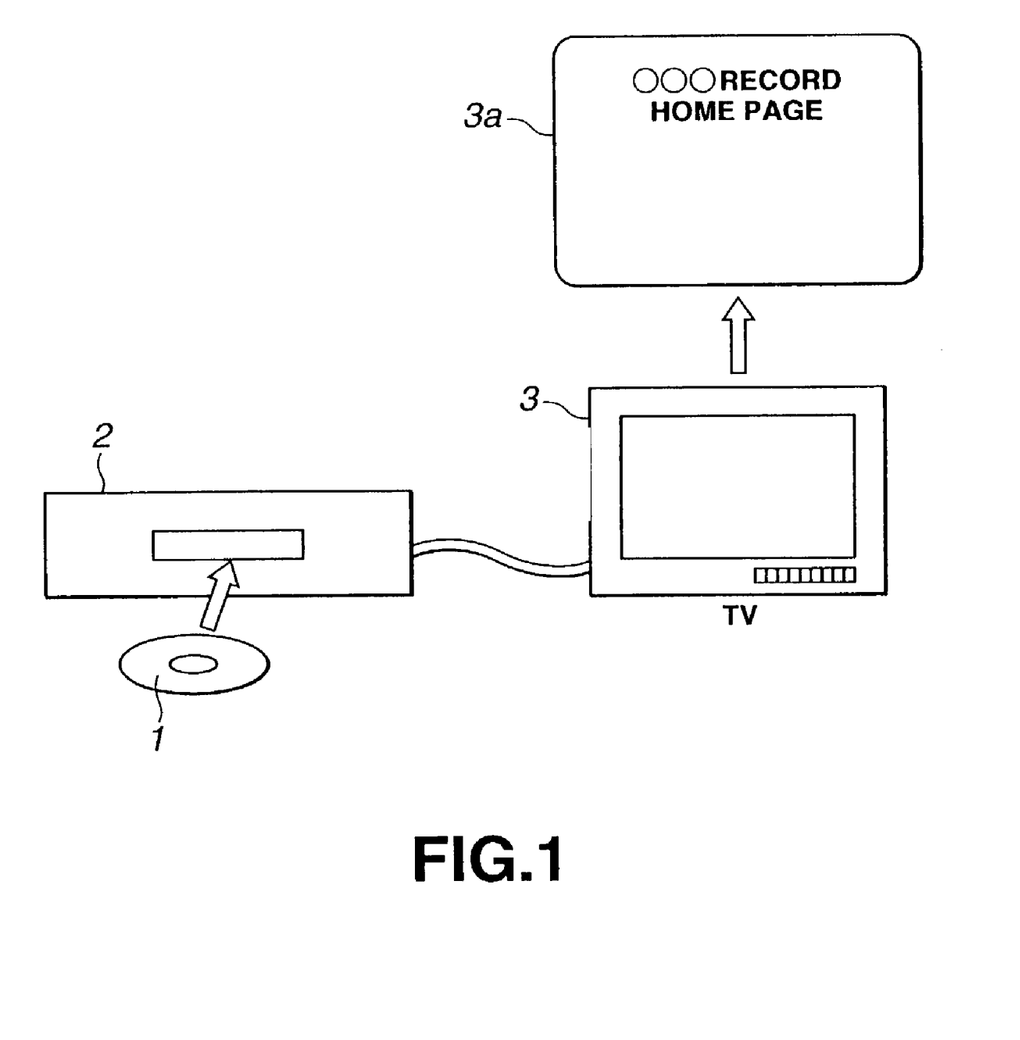
FIG. 1 shows a schematic view of an audio information service system employing the present intention.

The information service system employing the present invention is an audio information service system which includes an optical disc player 2, connected to a television receiver (TV) 3, to which an optical disc 1 is to be installed, and a registration apparatus of a specific record manufacture (○○○ record manufacturing company) being a terminal equipment which is connected to the optical disc player 2 by on-line via the television receiver (TV) 3, as shown in FIG. 1.

In the present invention to be described bellow, the optical disc player 2 as a terminal equipment or a personal computer, which has the optical disc player 2, as a terminal equipment is connected to a server apparatus, on which a home page of the specific record manufacture is displayed, via a network such as a telephone line, a communication network, etc.

When the optical disc 1 is installed to the optical disc player 2, the optical disc player 2 causes the TV 3 to display such as a URL being a home page address to guide the user to on-line connection. Then, the optical disc player 2 is connected to the server apparatus on which a home page of the specific record manufacture is displayed under guided procedure steps performed by the user or automatically, and a home page 3a of the specific record manufacture is displayed on the TV 3 after predetermined authentication processing is performed between the optical disc player 2 and the server apparatus. The optical disc player 2 reads out unique identification information (referred to as UID data, hereinafter) written to the optical disc 1 in advance by the specific record manufacture or the user, and transmits the UID data to the server apparatus or to the registration apparatus of the specific record manufacture via the server apparatus. Thus, in case the UID data is written to respective optical discs 1, each optical disc 1 can be identified. So, even though there are produced one million optical discs 1 of the same contents, one optical disc 1 among them can be distinguished from others. So long as the UID data is registered in the server apparatus or in the registration apparatus of the specific record manufacture, the optical disc 1 of a specific owner can be identified.

Figure 2:
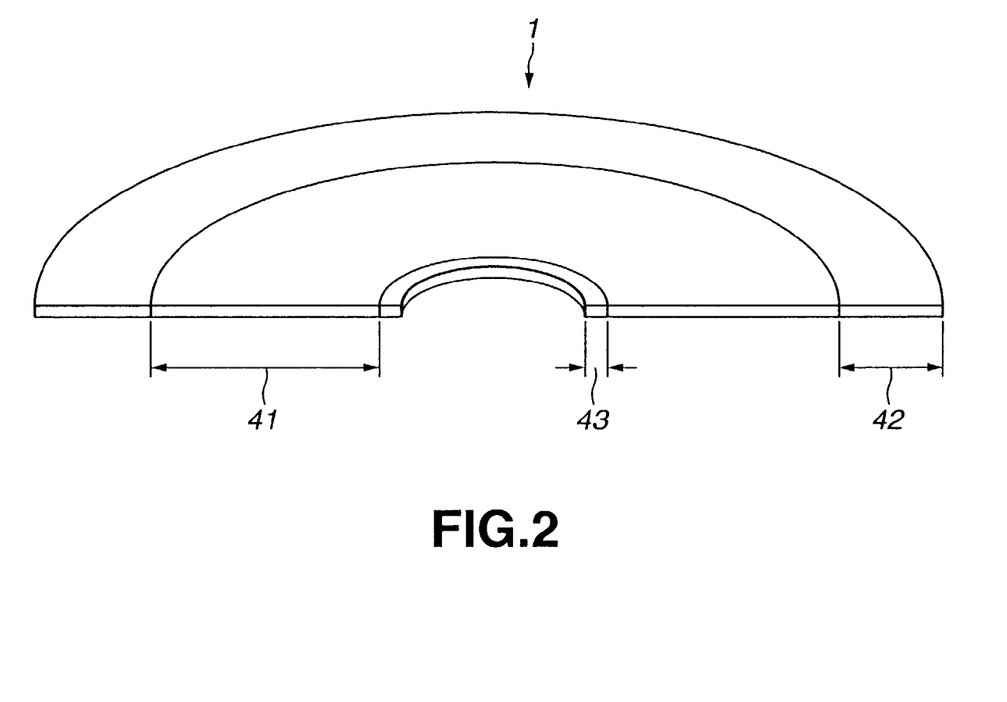
FIG. 2 shows a cross-sectional view of an optical disc having UID data recorded thereon.

The optical disc 1 employed in the present invention is of the same physical configuration as that of what is called a compact disc, and has an inner recording area 41 having format data recorded thereon compatible with a CD (Compact Disc), and an outer recording area 42 of a recording density higher than that of the inner recording area 41, for example double the recording density of the inner recording area 41, as shown in FIG. 2. The inner recording area 41 has recorded thereon the CD-DA (Digital Audio) data standardized by the Red Book or data based on the CD-ROM (Read Only Memory) format standardized by the Yellow Book. The track pitch of the outer recording area 42 is narrower than that of the inner recording area 41 by 1.6 μm. The encoding processing of either the modulation manner or the error correction manner performed for data recorded on the outer recording area 42 is different from that performed for data recorded on the inner recording area 41. The UID data is recorded to a lead-in area 43 whose data is firstly read out when the optical disc 1 is installed to the optical disc player 2, which area is located at the inner area of the inner recording area 41. The UID data is recorded by physically and chemically changing a reflecting film which is made of aluminum alloy and arranged on the basal plate of the optical disc 1 using the optical disc player 2 or an optical disc recording apparatus having recording function. The UID data may be written in the form of pit strings made up of a plurality of pits similar to data recorded on the inner recording area 41 or data recorded on the outer recording area 42, or may be recorded to a UID record area which is located at the inner area of the lead-in area 43 in the form of bar codes using a laser beam irradiated from a YAG laser.

In this embodiment, the optical disc from which audio information is reproduced is not restricted to the optical disc 1 shown in FIG. 2, and may be a CDR/RW, MO, DVD (Digital Versatile Disc), etc. Furthermore, instead of the optical disc 1 being a disc-shaped recording medium, other types of various recording media, for example, a card-shaped recording medium, a tape-shaped recording medium such as a magnetic tape, and a card-shaped recording medium using a semiconductor memory as a recording medium may be used.

The registration apparatus of the specific record manufacture registers the UID data read out from the optical disc 1 by the optical disc player 2 and transmitted from the optical disc player 2 via a network. The registration apparatus of the specific record manufacture may be a large computer having communication function.

Figure 3:
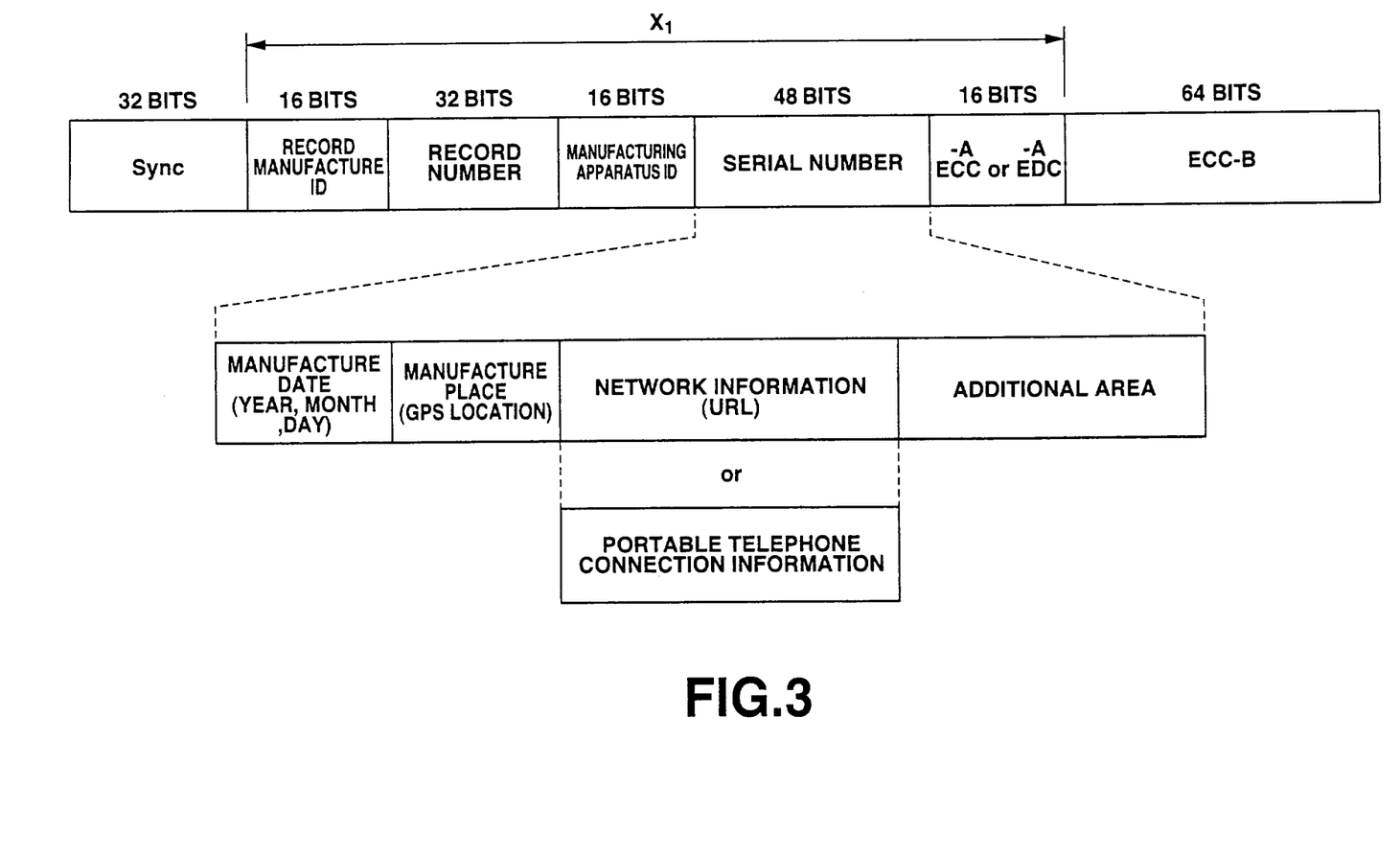
FIG. 3 shows a specific example of record format of the UID data.

FIG. 3 shows a specific example of record format of the UID data being the unique identification information. In FIG. 3, for example, an area composed of leading 32 bits of the UID data is set to be the synchronization (Sync) data area, while an area following the Sync data area is set to be the encryption area $X_1$ to which data information of the UID data to identify the optical disc 1 as a recording medium individually is recorded after undergoing conversion processing, specifically encryption processing. The encryption area $X_1$ is made up of 128 bits consisting of 16 bits ID data of the record manufacture (generally, contents manufacture and/or provider), 32 bits data indicative of record number (manufacturing number), 16 bits ID data of a manufacturing apparatus, 48 bits data indicative of a serial number, 16 bits error correction codes (ECC-A) or error detection codes (EDC-A). The manufacturing apparatus ID data is identification data of a manufacturing apparatus which records the 48 bits data indicative of a serial number, and the manufacturing apparatus ID data itself is also used as a part of individual ID data to identify a recording medium. The 48 bits data indicative of a serial number is the main portion of the individual identification data to identify a recording medium individually, and the record manufacture (contents manufacture and/or provider) can perform allocation in the area freely. The serial number itself is not necessarily a consecutive number.

In this embodiment, in the 48 bits data indicative of a serial number, data of manufacture date or manufacture year, month, and day of the optical disc 1 as a disc-shaped recording medium, data of manufacture place using GPS indicative of location, network information (URL) for making a connection to a network such as the internet using a portable telephone or a personal computer are allocated by the record manufacture (contents manufacture and/or provider). An additional area capable of recording other data may be formed in the 48 bits data indicative of a serial number. Following the encryption area $X_1$ consisting of from the 16 bits ID data of the record manufacture to the 16 bits error correction codes or error detection codes, 64 bits error correction codes (ECC-B) is further arranged. So, the UID data made up of the Sync data area, the encryption area $X_1$, and the ECC-B has 224 bits in all.

The 16 bits error correction codes (ECC-A) or error detection codes (EDC-A) are generated by the cyclic redundancy code (CRC) using a polynomial described bellow.

$$g(x)=x16+x12+x5+1$$

This polynomial g(x) may be arbitrary set up by the record manufacture (contents manufacture and/or provider). Thus, inconsistent "bit strings" can be surely excluded. The 16 bits error correction codes (ECC-A), whose purpose is different from that of the 64 bits error correction codes (ECC-B), is used not to perform error correction or error detection, which is the original purpose of error correction codes, but to perform authentication of the UID data.

The 64 bits error correction codes (ECC-B) are generated by the (24, 16, 9) Reed-Solomon Coding using a polynomial described bellow.

$$f(x)=x8+x4+x3+x2+1$$

$$\text{when } f(\alpha)=0$$

$$G(x)=(x+1)(x+\alpha)(x+\alpha2)\ldots(x+\alpha7)$$

This 64 bits error correction codes (ECC-B) has correction ability of 4 byte detection correction and 8 byte elimination correction.

As has been described above, the error correction codes arranged in the UID data uses two or more kinds of error correction codes (ECC) or error detection codes (EDC), one of which are used to perform error correction or error detection, which is the original purpose thereof, while the other of which are used to authenticate the UID data.

In the encryption area $X_1$ of the UID data, for example, 128 bits data is encrypted using the public key system of the RSA (Rivest, Shamir and Adleman) system or the common key system of the DES (Data Encryption Standard) system so that the UID data is not stolen by other users.

The record format of the UID data shown in FIG. 3 is one example, and the number of bits or the arrangement of respective areas can be set up arbitrary, and the number of kinds of areas can be increased or decreased.

In the audio information service system shown in FIG. 1, the optical disc player 2 reads out the UID data from the optical disc 1, and the URL of the record manufacture is read out from the UID data, and then the optical disc player 2 or a personal computer connected to the optical disc player 2 has an access to the home page 3a of the specific record manufacture based on the read out URL via a network to make a connection to the registration apparatus of the specific record manufacture. In result, the user can receive various service to be described later.

Figure 4:
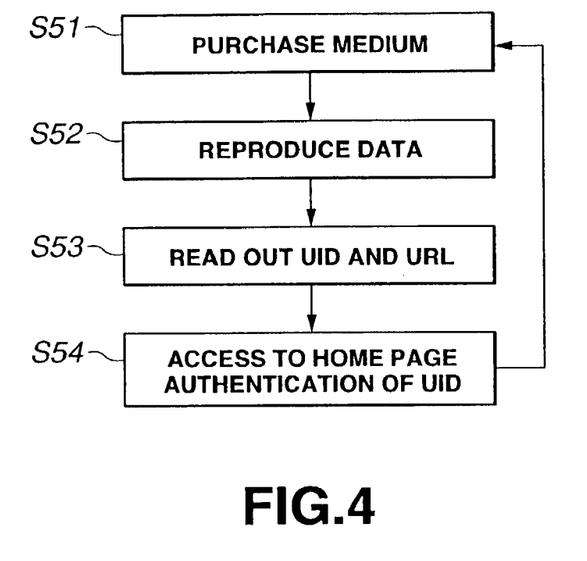
FIG. 4 shows a flow chart explaining one utilization example.

FIG. 4 shows a flow chart explaining the process from when the user purchases the optical disc 1 until when the optical disc player 2 or a personal computer connected to the optical disc player 2 is connected to the home page 3a of the ◯◯◯ record manufacturing company.

In step S51, the user purchases the optical disc 1 provided with the UID data. In step S52, the user reproduces data recorded on the optical disc 1 using the optical disc player 2. In step S53, the optical disc player 2 reads out the UID data and the URL of the record manufacture from the optical disc 1. In step S54, the optical disc player 2 or a personal computer connected to the optical disc player 2 has an access to the home page 3a of the specific record manufacture via a communication network such as the internet based on the read out URL. Then, when authentication processing is performed between the optical disc player 2 or a personal computer connected to the optical disc player 2 and the server apparatus or the registration apparatus of the specific record manufacture, the optical disc player 2 or the personal computer sends the UID data to the server apparatus or the registration apparatus. Then, the authentication of the UID data is performed, and the user can receive various service in case the authentication of the transmitted UID data is correctly performed. That is, the optical disc 1 provided with the UID data is linked to the home page 3a of the specific record manufacture, then the validity and the number of accessing time of the optical disc 1 is authenticated based on the UID data, and then the user is provided with various service.

The user who is proved to be valid can receive various service such as free net live programs of artists, downloading of music and lyrics, distribution of discount tickets of concerts, delivery of graffiti arts, etc. The user can receive service based on lot after the specific record manufacture accepts the UID data transmitted from respective users.

Figure 5:
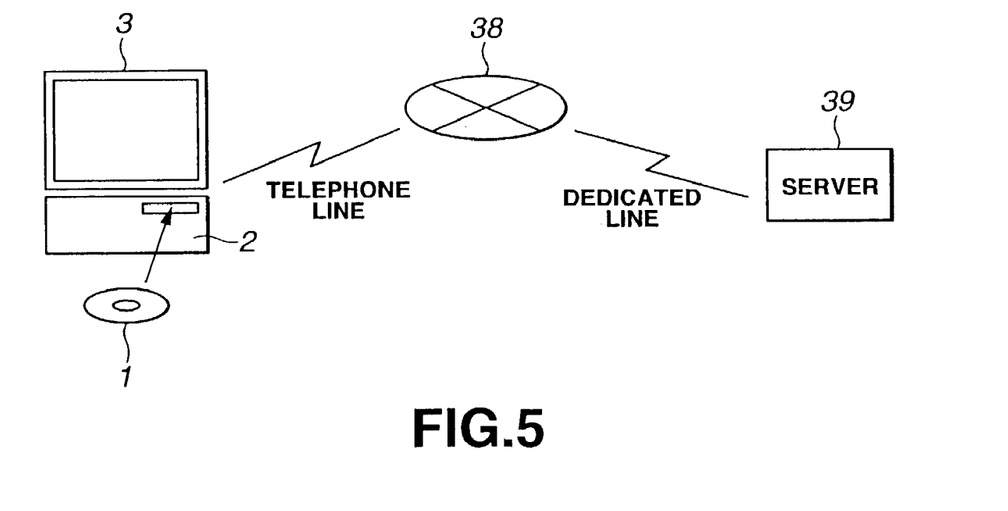
FIG. 5 shows a detailed schematic view of the audio information service system employing the present intention.

FIG. 5 shows a schematic view of a communication system in which the optical disc player 2 as a terminal equipment reads out data recorded on the optical disc 1 provided with UID data, and the optical disc player 2 communicates with a server apparatus 39 as the registration apparatus of the specific record manufacture being a service provider directly or using a personal computer, not shown, via an internet 38. In the example shown in FIG. 5, a terminal equipment composed of the optical disc player 2 and the TV 3 is connected to the server apparatus 39 via the internet 38, while in reality, a plurality of terminal equipments are connected to the server apparatus 39 via the internet 38.

Figure 6:
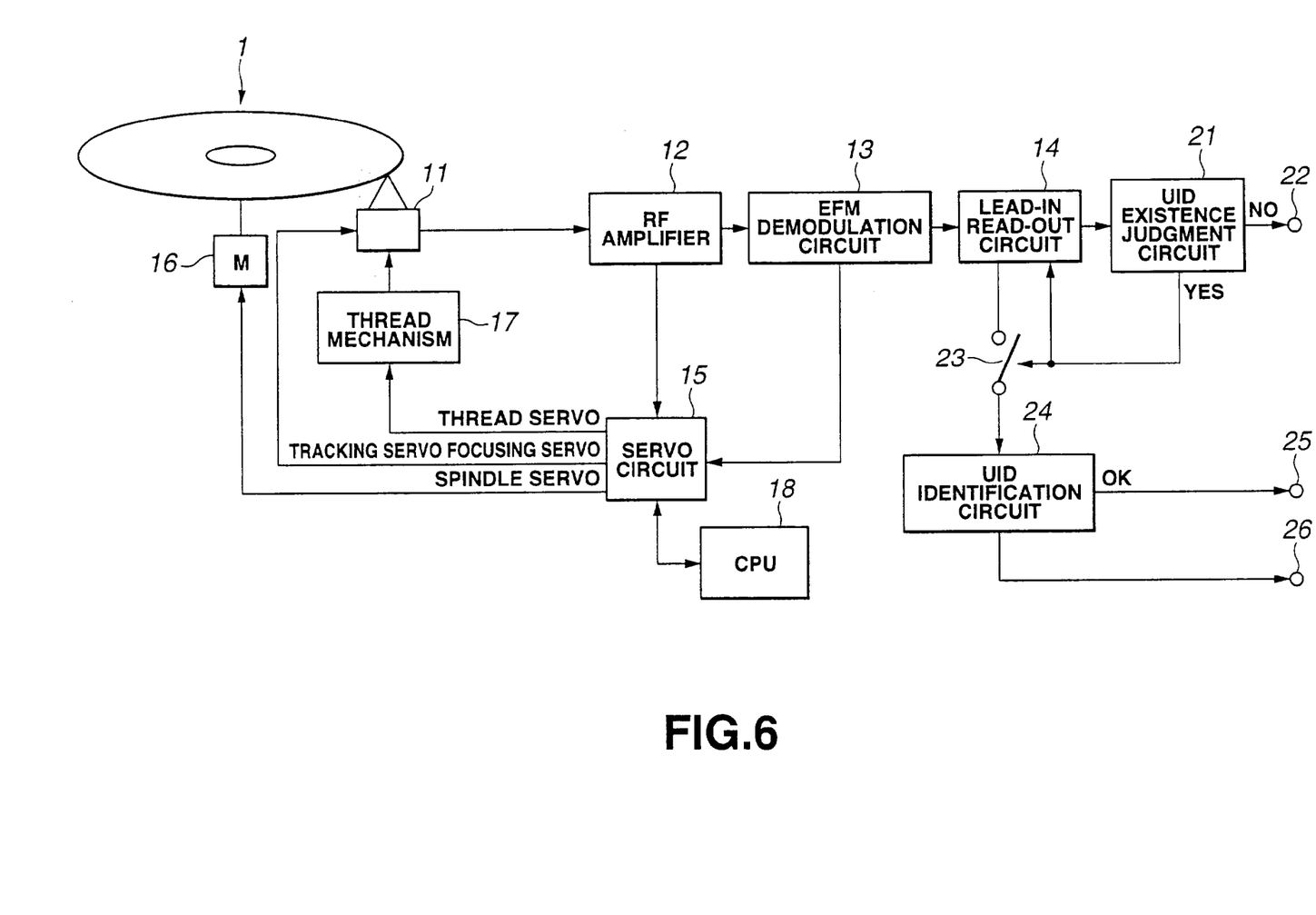
FIG. 6 shows a specific block diagram of an optical disc player.

FIG. 6 shows a specific block diagram of the optical disc player 2. As shown in FIG. 6, data recorded on the optical disc 1 is read out optically by an optical head 11, and output signals from the optical head 11 are sent to an RF amplifier 12. The RF amplifier 12 performs signal processing of amplification, etc. for the output signals form the optical head 11 to generate reproduced RF signals and other various signals for servo controlling. The reproduced RF signals from the RF amplifier 12 are sent to an EFM (8-14 modulation) demodulation circuit 13 to be EFM-demodulated, and thus EFM-demodulated signals are sent to a lead-in read-out circuit 14. Various signals for servo controlling (tracking error signals, focusing error signals, etc.) from the RF amplifier 12 and reproduction clock signals from the EFM demodulation circuit 13 are sent to a servo circuit 15, then the servo circuit 15 outputs various servo signals. That is, spindle servo signals from the servo circuit 15 are sent to a spindle motor 16 for driving or rotating the optical disc 1, and tracking servo signals and focusing servo signals are sent to an actuator of an objective lens arranged at the optical head 11, and thread servo signals are sent to a thread drive motor of a thread mechanism 17 for moving the optical head 11 along the radial direction of the optical disc 1. Commands and control signals are sent between the servo circuit 15 and a controller 18. The controller 18 may be a microcomputer.

The lead-in read-out circuit 14 extracts data recorded on the lead-in area 43 of the optical disc 1 out of output data from the EFM demodulation circuit 13, and sends thus extracted data to a UID existence judgement circuit 21. The UID existence judgement circuit 21 detects existence judgement information of the UID data out of output data from the lead-in read-out circuit 14 to judge whether the UID data is recorded on the optical disc 1 or not, that is judges the existence of the UID data. In case the UID existence judgement circuit 21 judges that there is no UID data, the optical disc player 2 reproduces data recorded on the optical disc 1 based on a conventional format such as the compact disc standard format, and outputs reproduced data from an output terminal 22. On the other hand, in case the UID existence judgement circuit 21 judges that there exists the UID data, the UID existence judgement circuit 21 sends control signals to the lead-in read-out circuit 14 and to a switch 23 so as to cause the lead-in read-out circuit 14 to resend data read out from the lead-in area 43 as well as turn on the switch 23 to send signals including the UID data from the lead-in read-out circuit 14 to a UID identification circuit 24. In this example, it is assumed that the UID data is recorded in the lead-in area 43. In case the UID data is recorded to the UID record area located at the inner area of the lead-in area 43, as has been described above, the UID data recorded on the UID record area is read out and sent to the UID identification circuit 24. The UID identification circuit 24 extracts the UID data out of output data from the lead-in read-out circuit 14. Then, thus extracted UID data is output from an output terminal 26, and transmitted to the server apparatus 39 via the internet 38. At this time, the controller 18 outputs reproduced data from an output terminal 25 to a reproduced signal processing circuit, not shown.

Next, the operation of the audio information service system shown in FIG. 5 will be explained in detail. Firstly, setting up and resetting processing of the owner of the optical disc 1 will be explained with reference to FIG. 7. In the following processing, it is assumed that the user purchased a new optical disc 1, while the owner of the optical disc 1 has not been specified. And, the case in which the user who purchased the optical disc 1 has registered the owner and the case in which the user who purchased the optical disc 1 has not registered the owner will be explained. In case the user does not want to register the owner, the user can make the optical disc 1 unowned.

Figure 7:
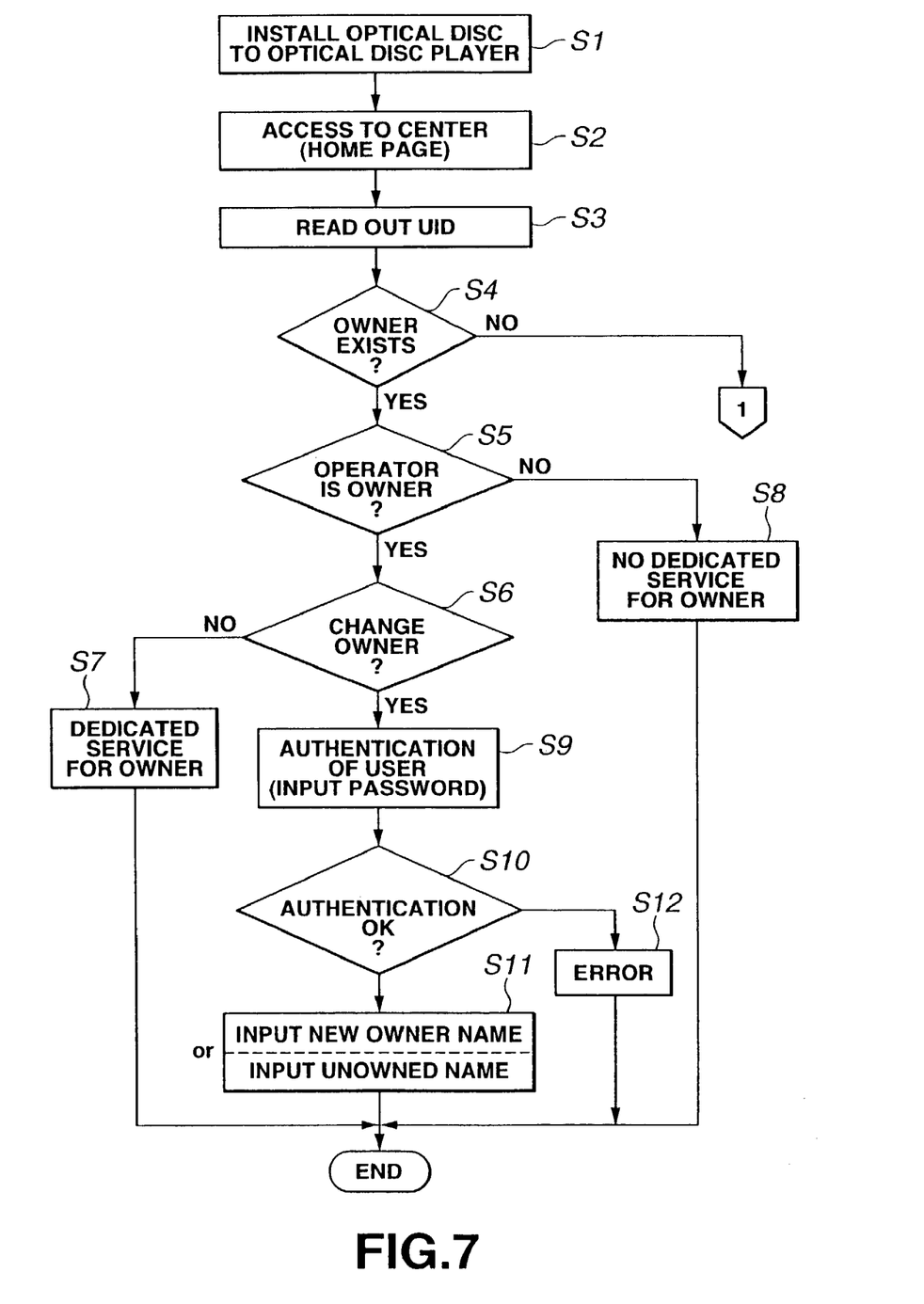
FIG. 7 shows a flow chart explaining the first half of setting up and resetting processing of the owner of the optical disc in the audio information service system.

In step S1, the optical disc 1 is installed to the optical disc player 2. In step S2, the optical disc player 2 or a personal computer, not shown, connected to the optical disc player 2 has an access to the home page 3a of the specific record manufacture via a communication network such as the internet. Then, the home page 3a is displayed on a display of the TV 3.

Next, in step S3, the server apparatus 39 as the registration apparatus of the specific record manufacture reads out the UID data which is extracted from the optical disc 1 under the above-described processing by the optical disc player 2 and transmitted via a communication network such as the internet. After the server apparatus 39 as the registration apparatus of the specific record manufacture reads out the UID data sent from the user, in step S4, the existence of the owner of the optical disc 1 is judged based on the read out UID data. In case it is judged that there exists an owner of the optical disc 1 in step S4, then in step S5, it is judged whether the operator who operates the optical disc player 2 currently and operates the home page 3a of the specific record manufacture is the owner or not. The judgement in step S5 is performed by the server apparatus 39 by prompting the user to input his predetermined password and judging the validity of the input password.

In case it is judged that the operator of the optical disc player 2 and the home page 3a is the owner of the optical disc 1 in step S5, then in step S6, it is judged whether the operator as the owner changes the owner or not. The change of the owner in step S6 takes transfer or donation of the optical disc 1 into consideration. In case it is judged that the operator does not change the owner in step S6, then instep S7, the specific record manufacture provides the operator with dedicated service intended for the owner.

In case it is judged that the operator of the optical disc player 2 and the home page 3a is not the owner of the optical disc 1 in step S5, then in step S8, the specific record manufacture does not provide the operator with dedicated service intended for the owner.

In case it is judged that the operator changes the owner in step S6, then in step S9, authentication of the operator as the user is performed by prompting the user to input his password. Then in step S10, authentication is performed by judging the validity of the input password or judging whether the input password is correct or not. In case the authentication of the operator as the user is correctly performed in step S10 that is the input password is correct, then in step S11, the operator as the user inputs a new owner name or data for making the optical disc 1 unowned.

In case the authentication of the operator as the user is not correctly performed in step S10, that is, in case it is judged that the operator as the user is not the owner, it is judged that unfair processing is performed. Then, in step S12, the processing is judged to be error. At this time, notification indicative of error is displayed on the TV 3.

Figure 8:
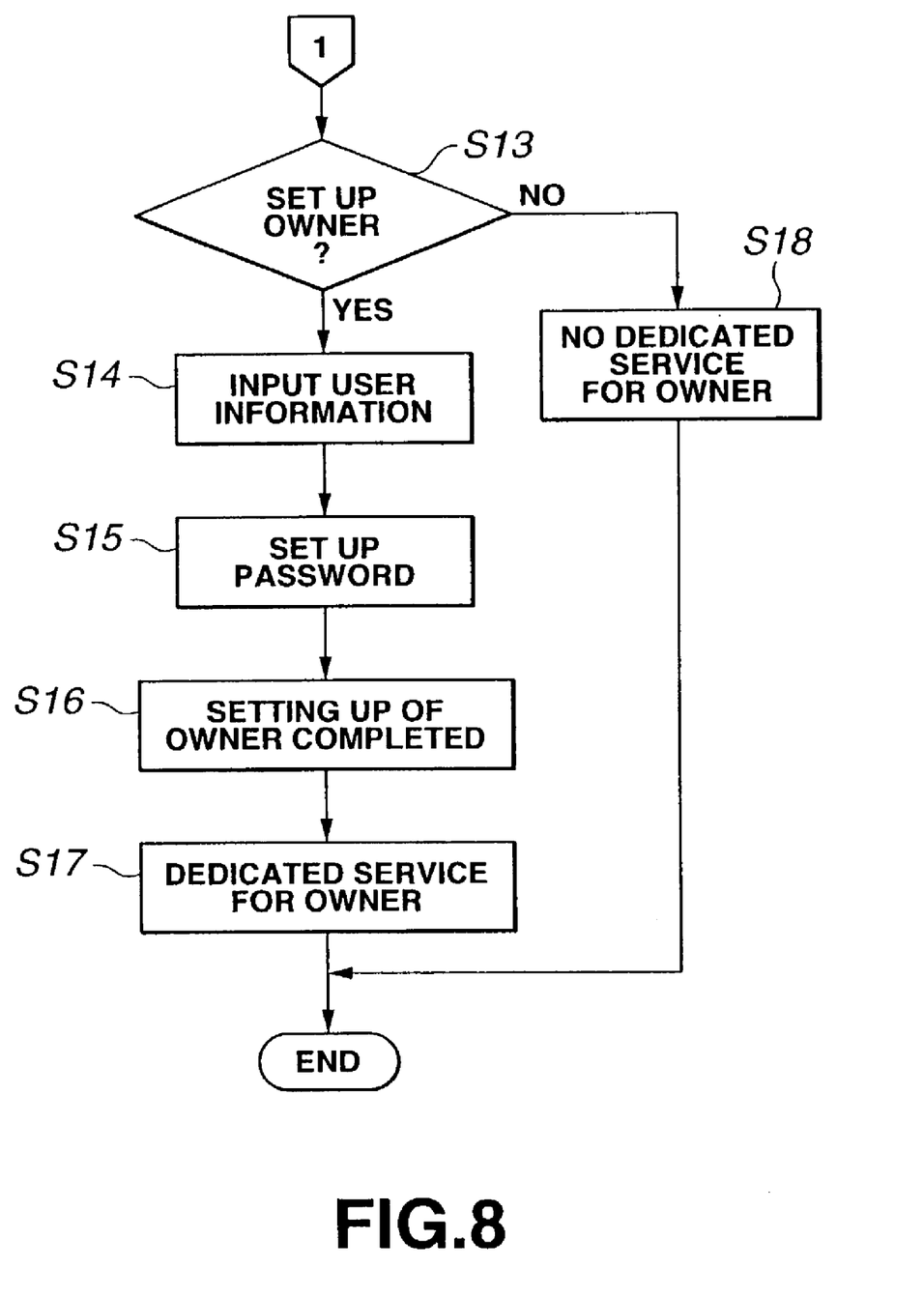
FIG. 8 shows a flow chart explaining the latter half of setting up and resetting processing of the owner of the optical disc in the audio information service system.

In step S4, in case the read out UID data does not correspond to registered UID data and it is judged that there exists no owner of the optical disc 1, then in step S13 shown in FIG. 8, it is judged whether the operator sets up the owner of the optical disc 1 or not.

As shown in FIG. 8, in case the operator selects the setting up of the owner in step S13, then in step S14, after the display screen of the TV 3 is changed, information related to the owner, or the operator as the user is input. After the user information is input in step S14, then in step S15, the server apparatus 39 of the specific record manufacture causes the operator to set up a password. Then in step S16, setting up of the owner is completed. Then in step S17, thus newly registered operator as the owner is provided with dedicated service intended for the owner. In step S14, a display screen indicating input items to perform setting up of the owner is displayed on a monitor of the TV 3 or a personal computer being the terminal equipment based on data from the server apparatus 39.

In case the operator does not select the setting up of the owner in step S13, then in step S18, dedicated service intended for the owner is not provided.

That is, when the operator is proved to be the owner after the owner registration or owner change registration, the operator can receive dedicated service intended for the owner as long as the registered optical disc 1 is installed to the optical disc player 2 and the data thereof is reproduced.

Figure 9:
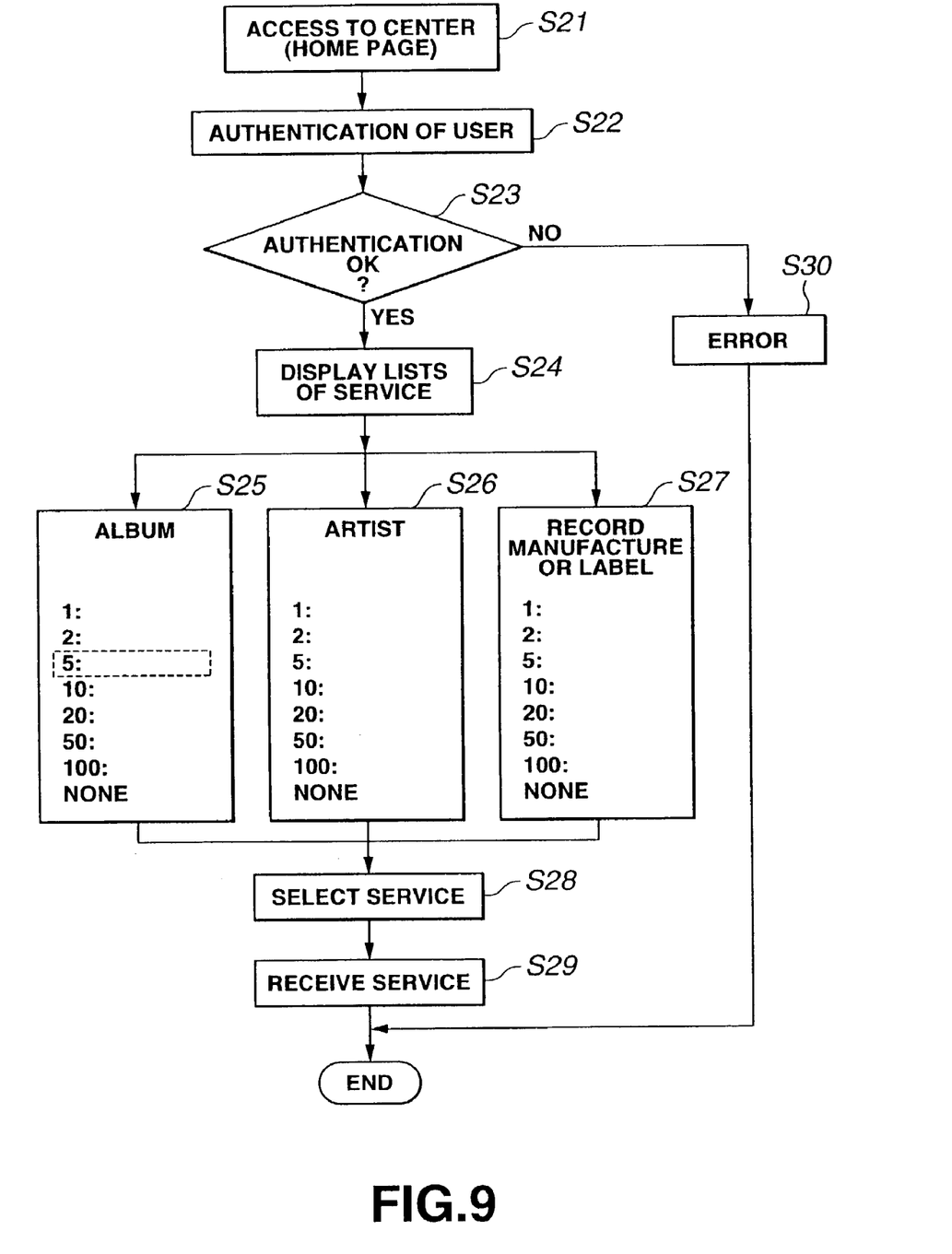
FIG. 9 shows a flow chart explaining the processing when there are various kinds of dedicated service in accordance with the number of the optical discs in the audio information service system.

Next, the processing when there are various kinds of dedicated service which depends on the number of the optical disc 1 will be explained with reference to FIG. 9.

First, in step S21, the optical disc player 2 or a personal computer connected to the optical disc player 2 has an access to the home page 3a of the specific record manufacture via a communication network such as the internet. Then in step S22, the operator inputs his password which had been set up by the owner in advance, and the user authentication is performed by judging the validity of the input password. In step S23, it is judged whether the operator is the owner or not, and in case the authentication is correctly performed, then in step S24, lists of service which the owner can receive is displayed on the home page 3a. The operator as the owner is made select service from the service lists. At this time, the operator as the owner can know that the operator is provided with service under point system when the contents are displayed on the home page 3a of the TV 3, that is, the operator can receive service which differs every album, artist, record manufacture or label depending on the possessed points. Thus, the operator can know which service he can receive. The server apparatus 39 performs operation for indicating which service the operator can receive, and performs the processing for displaying and notifying the service on the terminal equipment.

For example, in step S25, when the operator selects the album, points which has been obtained by the owner and service corresponding to the points will be displayed in a frame (shown as dotted frame in FIG. 9) or displayed in a flashing manner. The points concerning the album corresponds to the number of the album in case a plurality of the same albums are possessed.

In step S26, when the operator as the owner selects the artist, the owner can know the kinds of service corresponding to points based on the total number of the optical discs 1 of the same artist. In this case, similar to the step S25, the points are determined based on the total number of the optical discs 1 of an artist possessed by the operator, and the service is known to the operator when the service and the points will be displayed in a dotted frame or displayed in a flashing manner on the home page 3a of the TV 3. The total number of the optical discs 1 corresponds to the total number of the optical discs 1 registered in the server apparatus 39.

In step S27, when the operator as the owner selects the record manufacture or label, the owner can know the kinds of service corresponding to points based on the total number of the optical discs 1 of the same record manufacture or label. In this case, the total number of the optical discs 1 corresponds to the number of possession registered in the server apparatus 39.

In step S28, when the operator as the owner selects service corresponding to points among service of the album, artist, record manufacture or label, and performs determination operation, data based on selected and determined service is transmitted to the server apparatus 39 of the specific record manufacture. Then, in step S29, after receiving the transmitted data based on the selected service, the server apparatus 39 of the specific record manufacture sends data corresponding to the selected service to the operator as the owner, that is, to the optical disc player 2 or a personal computer via a communication network such as the internet so as to provides the owner with the service.

By thus performing the above-described processing, the server apparatus 39 of the specific record manufacture as the center side can grasp the number of media possessed by the operator or the user every album, artist, or record manufacture. Thus, the center side can provide the user with service corresponding to the number. The more the number of the optical discs 1 as contents recording media possessed by the user, the higher the grade of service becomes. As has been described above, there is advantage that once the owner performs registration, the owner can receive service.

Next, the processing when service the user can receive differs depending on the optical disc 1, or the processing when the kind of service is determined will be explained with reference to FIG. 10.

In step S31, the optical disc 1 is installed to the optical disc player 2. In step S32, the optical disc player 2 or a personal computer, not shown, connected to the optical disc player 2 has an access to the home page 3a of the specific record manufacture via a communication network such as the internet. That is, the optical disc player 2 or a personal computer connected to the optical disc player 2 has an access to the server apparatus 39.

Next, in step S33, the server apparatus 39 as the registration apparatus of the specific record manufacture reads out the UID data which is extracted from the optical disc 1 by the optical disc player 2 and transmitted via a communication network such as the internet. After the server apparatus 39 as the registration apparatus of the specific record manufacture reads out the UID data sent from the user, in step S34, the grade or rank of service which the user is provided with is judged using the read out UID data.

Concerning the grade of the service, there are A rank, B rank, and C rank, where the A rank is highest rank and the C rank is normal rank and the B rank is between the A rank and the C rank. In step S34, in case it is judged that service of the A rank or the B rank can be provided, then in step S35, inputting for performing authentication of the operator as the owner is performed. As described above, for example, the authentication is performed by judging the validity of the password input by the operator. In case the authentication is correctly performed, that is Yes in step S36, then in step S37, the server apparatus 39 provides the user with A rank service or B rank service. In case the authentication is not correctly performed in step S36, then in step S38, the processing is judged to be error. At this time, the TV 3 displays that the authentication is not correctly performed. In step S34, in case it is judged that the server apparatus 39 provides the user with C rank service, then in step S39, the server apparatus 39 provides the user with C rank service of normal service. In step S37, the user may be made select the A rank service or the B rank service.

Figure 10:
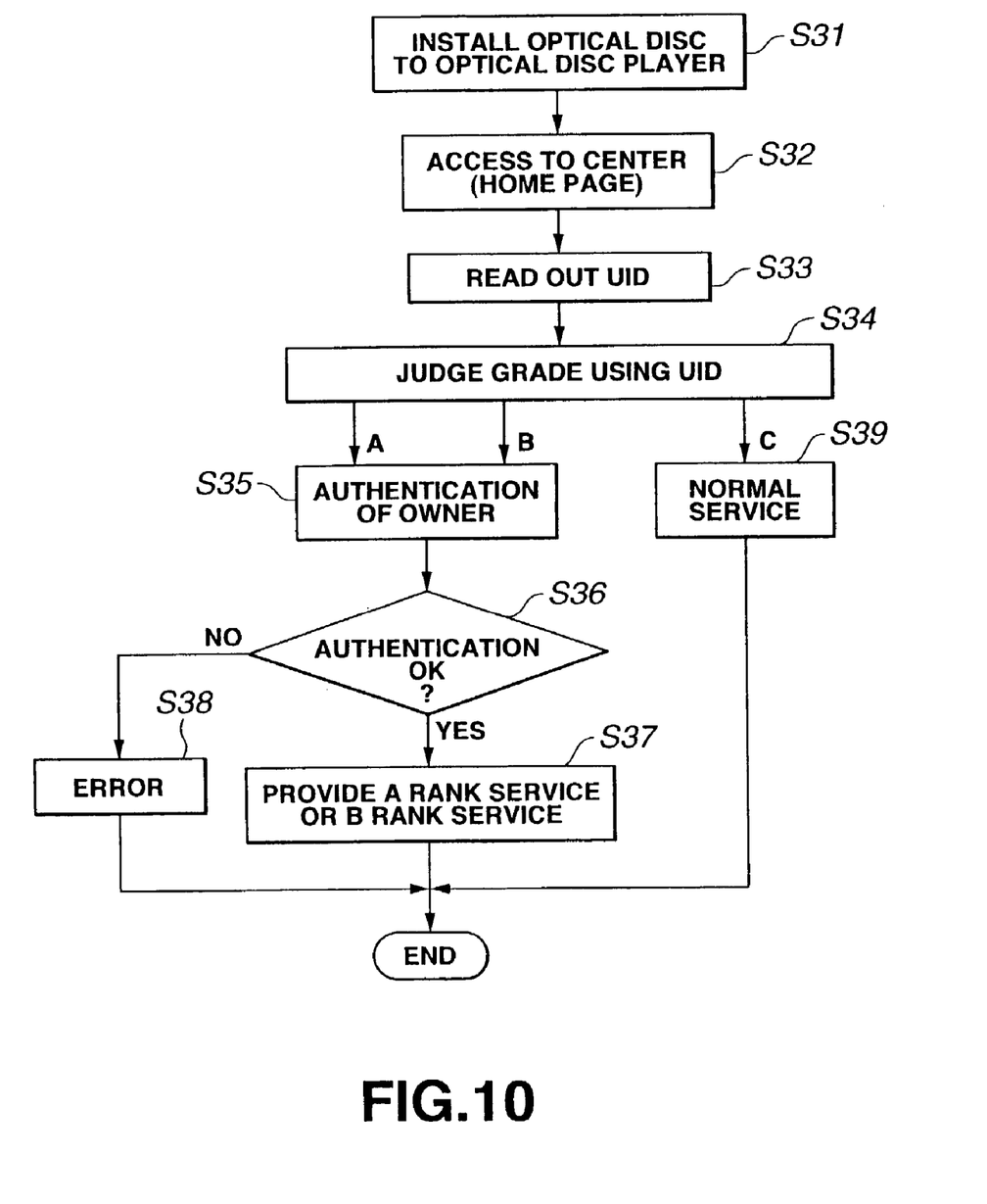
FIG. 10 shows a flow chart explaining the processing when the kind of service is determined depending on the optical disc in the audio information service system.

The processing shown in FIG. 10 gives ranks to the optical disc 1 in advance. In this processing, different ID data may be given to respective recording areas of the optical disc 1 depending on the price of the optical disc 1 to change the contents of service. As the C rank service, service which a person who does not own the optical disc 1 can be provided with may be prepared.

In employing the present invention, the owner of the optical disc 1 to be rented may be set to be an optical disc livery or a person who firstly rented the optical disc 1. Also, in the present invention, for example, at the user side and at the center side, setting up of the owner and change of the owner can be performed freely. Also, the optical disc 1 may be made unowned.

By employing the present invention, a part of sales of the optical discs as media having contents such as music, etc. recorded thereon can be returned to the user, while a part of collected money can be returned to the user when the optical discs are used under the pay-per-use.

Furthermore, the optical disc itself can be used as a registered bond or a registered stock.

As in the above, according to the present invention, the owner of the optical disc can be specified using the UID data, and the ownership and non-ownership of the optical disc can be determined by the user (owner) side or by the center side (record manufacture), and further the ownership can be transferred.

According to the present invention, quality and quantity (including distribution money) of service can be changed in accordance with the owner, which enables thorough service. Thus, desire to purchase the optical disc is stimulated.

According to the present invention, service can be changed in accordance with the ownership and non-ownership of the optical disc. For example, in the above-described embodiment, ranks of service to be provided are determined based on the transmitted UID data. On the other hand, data related to a rank of service may be included in the UID data in advance so as to change quality and quantity of service to be provided in accordance with data indicative of the rank extracted from the UID data. Thus, according to the present invention, optical discs of high rank service can be sold at a high price.

According to the present invention, the optical disc player or a personal computer connected to the optical disc player has communication function to make a connection to a communication network, while a television receiver may have communication function to make a connection to a communication network such as the internet.

INDUSTRIAL APPLICABILITY

As in the above, according to the present invention, unique identification information written to recording media such as the optical discs having contents of music, etc. recorded thereon is transmitted to the contents provider via a communication network such as the internet. Thus, the user can be provided with various service by utilizing the transmitted unique identification information. So, the user is provided with various service from the contents provider, which promotes desire to purchase the optical discs having contents of music, etc. recorded thereon.

The invention claimed is:

1. An information service method, comprising the steps of:
   reading out unique identification information written on a recording medium using a terminal equipment having the recording medium installed thereon;
   transmitting the unique identification information obtained in the step of reading out from the terminal equipment via a communication network;
   registering the unique identification information transmitted in the step of transmitting using a server apparatus; and
   determining a grade of service by utilizing the unique identification information.

2. The information service method as set forth in claim 1, further comprising the step of judging whether data related to an owner of the recording medium corresponding to the transmitted unique identification information exists by the server apparatus, and data related to dedicated service intended for the owner is transmitted to the terminal equipment when it is judged that data related to the owner exists.

3. The information service method as set forth in claim 2, wherein, when it is judged that data related to the owner exists, judging whether an operator of the terminal equipment is the owner, and data related to the dedicated service is transmitted to the terminal equipment when it is judged that the operator is the owner.

4. The information service method as set forth in claim 3, wherein data related to the dedicated service is not transmitted to the terminal equipment when it is judged that the operator is not the owner.

5. The information service method as set forth in claim 2, wherein, when it is judged that the operator is the owner, performing authentication of the operator of the terminal equipment when the operator changes the owner, and data indicative of the owner corresponding to the transmitted unique identification information is rewritten when the authentication is correctly performed.

6. The information service method as set forth in claim 5, wherein notification indicative of an error is displayed on the terminal equipment when the authentication is not correctly performed.

7. The information service method as set forth in claim 2, wherein, when it is judged that data related to the owner corresponding to the transmitted unique identification information does not exist by the server apparatus, displaying on a display screen of the terminal equipment input items to perform setting up of the owner when the operator performs the setting up of the owner.

8. The information service method as set forth in claim 2, wherein, when it is judged that data related to the owner corresponding to the transmitted unique identification information does not exist by the server apparatus, data related to dedicated service intended for the owner is not transmitted to the terminal equipment when an operator does not perform the setting up of the owner.

9. The information service method as set forth in claim 1, wherein data related to dedicated service intended for an owner corresponding to the transmitted unique identification information is transmitted to the terminal equipment from the server apparatus.

10. The information service method as set forth in claim 9, wherein authentication of an operator of the terminal equipment is performed, and data related to the dedicated service is transmitted to the terminal equipment when the authentication is correctly performed.

11. The information service method as set forth in claim 9, wherein data to notify the dedicated service which an operator of the terminal equipment can receive is transmitted to the terminal equipment based on the unique identification information transmitted by the server apparatus.

12. The information service method as set forth in claim 9, wherein a kind of the dedicated service corresponding to the transmitted unique identification information is selected, and data related to selected dedicated service is transmitted to the terminal equipment.

13. The information service method as set forth in claim 12, wherein authentication of an operator of the terminal equipment is performed after the kind of the dedicated service is selected, and data related to the dedicated service is transmitted to the terminal equipment in case the authentication is correctly performed.

14. An information service system, comprising:
    a terminal equipment operable to read out unique identification information written on a recording medium installed in the terminal equipment;
    a server apparatus operable to register unique identification information transmitted via a communication network, wherein the server apparatus is connected to the terminal equipment via the communication network; and
    means for determining a grade of service by utilizing the unique identification information.

15. The information service system as set forth in claim 14, wherein the server apparatus judges whether data related to an owner of the recording medium corresponding to the transmitted unique identification information exists, and transmits data related to dedicated service intended for the owner to the terminal equipment when it is judged that data related to the owner exists.

16. The information service system as set forth in claim 15, wherein, when it is judged that data related to the owner exists, the server apparatus judges whether an operator of the terminal equipment is the owner, and transmits data related to the dedicated service to the terminal equipment when it is judged that the operator is the owner.

17. The information service system as set forth in claim 16, wherein the server apparatus does not transmit data related to the dedicated service to the terminal equipment when it is judged that the operator is not the owner.

18. The information service system as set forth in claim 15, wherein, when it is judged that an operator is the owner, the server apparatus performs authentication of the operator of the terminal equipment when the operator changes the owner, and allows data indicative of the owner corresponding to the transmitted unique identification information to be rewritten when the authentication is correctly performed.

19. The information service system as set forth in claim 18, wherein the server apparatus displays notification indicative of an error on the terminal equipment when the authentication is not correctly performed.

20. The information service system as set forth in claim 15, wherein, when it is judged that data related to the owner corresponding to the transmitted unique identification information does not exist, a display screen of the server apparatus displays input items to perform setting up of the owner on the terminal equipment when an operator performs the setting up of the owner.

21. The information service system as set forth in claim 15, wherein, when it is judged that data related to the owner corresponding to the transmitted unique identification information does not exist, the server apparatus does not transmit data related to dedicated service intended for the owner to the terminal equipment when an operator does not perform the setting up of the owner.

22. The information service system as set forth in claim 14, wherein the server apparatus transmits data related to a dedicated service intended for owner corresponding to the transmitted unique identification information to the terminal equipment.

23. The information service system as set forth in claim 22, wherein the server apparatus performs authentication of an operator of the terminal equipment, and transmits data related to the dedicated service to the terminal equipment when the authentication is correctly performed.

24. The information service system as set forth in claim 22, wherein the server apparatus transmits data to notify the dedicated service that the operator of the terminal equipment can receive to the terminal equipment based on the transmitted unique identification information.

25. The information service system as set forth in claim 22, wherein a kind of the dedicated service corresponding to the transmitted unique identification information is selected, and the server apparatus transmits data related to the dedicated service that is selected to the terminal equipment.

26. The information service system as set forth in claim 25, wherein the server apparatus performs authentication of the operator of the terminal equipment, and transmits data related to the dedicated service to the terminal equipment when the authentication is correctly performed.

27. An information service method, comprising: reading out unique identification information written on a recording medium using a terminal equipment;
  transmitting the unique identification information read out by the terminal equipment via a communication network to a server apparatus; and
  transmitting data related to a grade of service by utilizing the transmitted unique identification information to the terminal equipment from the server apparatus.

28. The information service method as set forth in claim 27, further comprising performing authentication of an operator of the terminal equipment, and in which data related to the grade of service is transmitted to the terminal equipment when the authentication is correctly performed.

29. The information service method as set forth in claim 27, further comprising selecting a kind of the service corresponding to the transmitted unique identification information, and in which data related to the selected dedicated service is transmitted to the terminal equipment.

30. The information service method as set forth in claim 29, wherein authentication of an operator of the terminal equipment is performed, and data related to the service is transmitted to the terminal equipment in case the authentication is correctly performed.

* * * * *